Figure 1:
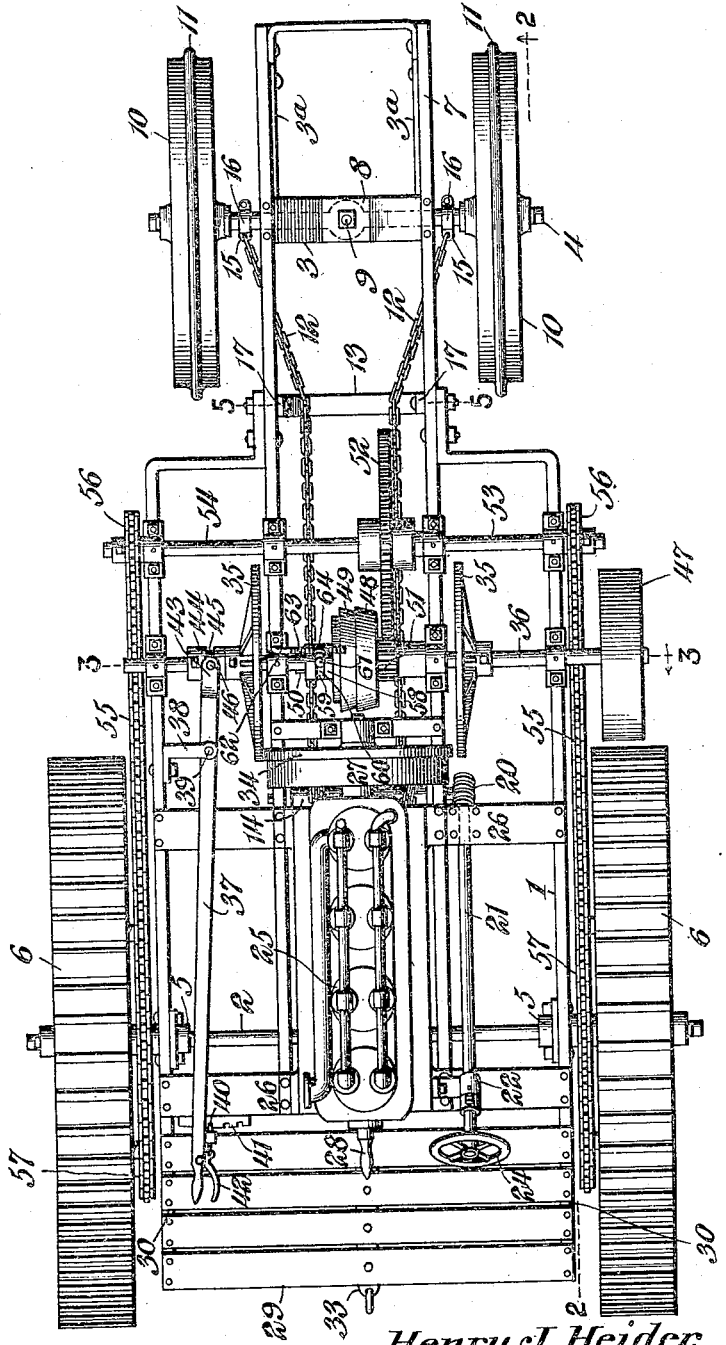

H. J. HEIDER.
TRACTION ENGINE.
APPLICATION FILED FEB. 20, 1911.

1,055,635.

Patented Mar. 11, 1913.
3 SHEETS—SHEET 1.

WITNESSES
Howard D. Orr.
H. J. Riley

Henry J. Heider, INVENTOR
BY
E. G. Siggers,
ATTORNEY

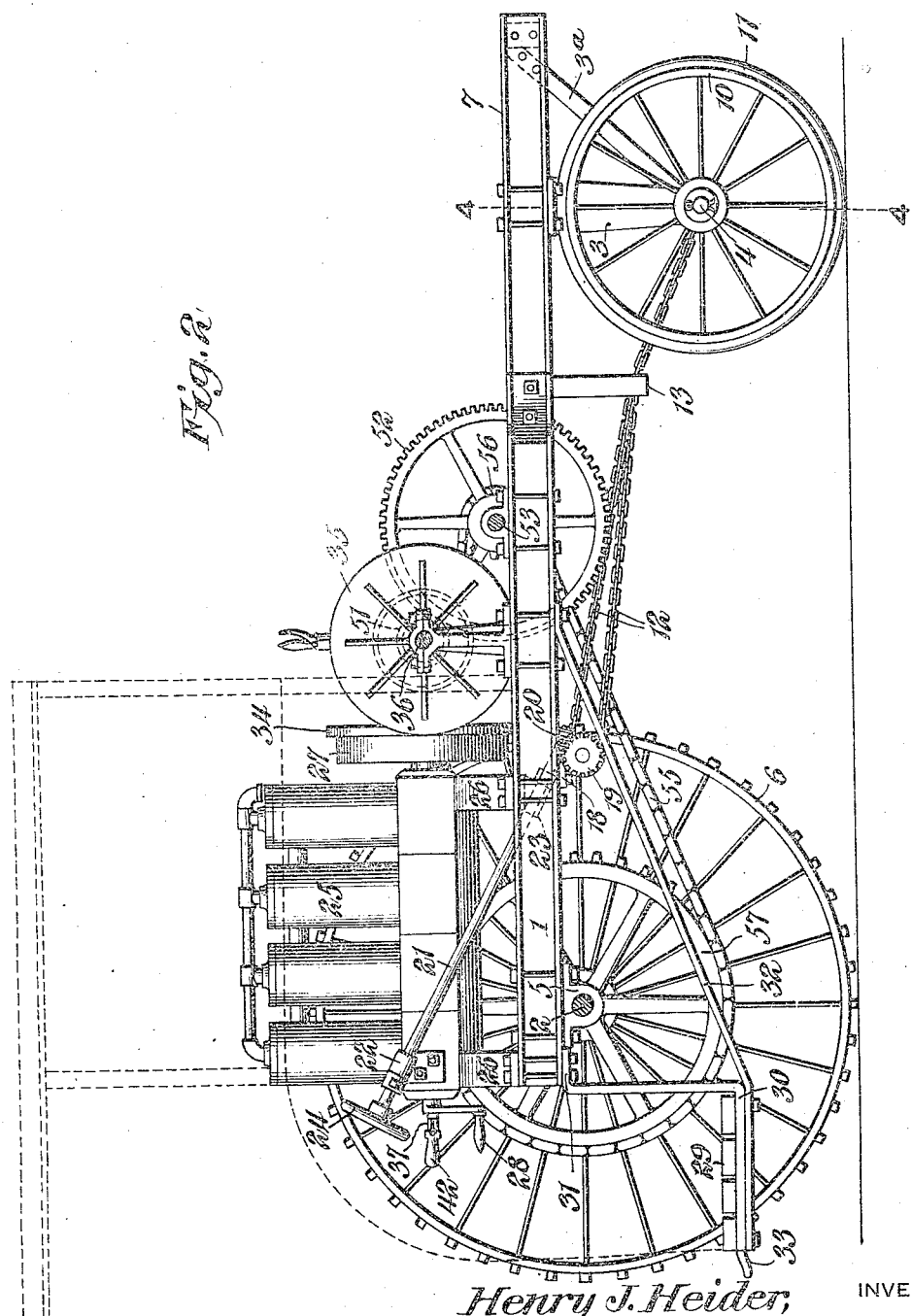

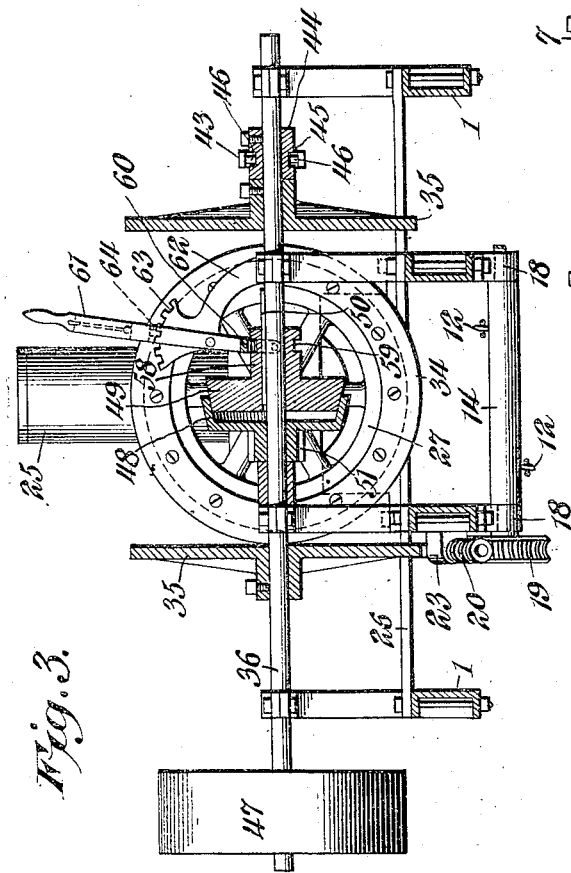

UNITED STATES PATENT OFFICE.

HENRY J. HEIDER, OF CARROLL, IOWA, ASSIGNOR TO HEIDER MANUFACTURING COMPANY, OF CARROLL, IOWA.

TRACTION-ENGINE.

1,055,635.   Specification of Letters Patent.   Patented Mar. 11, 1913.

Application filed February 20, 1911. Serial No. 609,681.

*To all whom it may concern:*

Be it known that I, HENRY J. HEIDER, a citizen of the United States, residing at Carroll, in the county of Carroll and State of Iowa, have invented a new and useful Traction-Engine, of which the following is a specification.

The invention relates to improvements in traction engines.

The object of the present invention is to improve the construction of traction engines, and to provide a simple, durable and efficient traction engine, designed for operating agricultural and other machines and also for plowing and various other traction purposes, and equipped with transmission gearing connecting the engine with the traction wheels and with the driving pulley, and adapted to be arranged for driving the machine either backward or forward and also for operating the driving pulley while the machine is stationary.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a plan view of a traction engine, constructed in accordance with this invention. Fig. 2 is a longitudinal sectional view on the line 2—2 of Fig. 1. Fig. 3 is a transverse sectional view on the line 3—3 of Fig. 1. Fig. 4 is a similar view on the line 4—4 of Fig. 2. Fig. 5 is a detail sectional view on the line 5—5 of Fig. 1.

Like numerals of reference designate corresponding parts in all the figures of the drawings.

1 designates a horizontal main frame supported at the back by a rear axle 2 and at the front by an approximately U-shaped bolster 3, which is mounted upon a front axle 4. The rear axle, which is rigidly connected with the frame 1, is mounted in suitable bearings 5 and its spindles receive driving or traction wheels 6. The frame 1 has a reduced front portion 7, and the bolster 3 consists of inclined sides, secured at their upper terminals to the reduced portion 7 of the main frame, and connected at their lower terminals by a horizontal bottom portion 8, arranged flat upon the upper face of the front axle 4, which is pivoted to the bolster by a vertical king bolt 9. The bolster is rigidly held in a vertical position by inclined braces 3ª, secured at their upper ends to the reduced portion 7 of the frame 1 at the front end thereof and connected at their lower ends to the sides of the bolster a short distance above the front axle.

The front axle is of a length less than that of the rear axle, and it is provided with spindles, which receive relatively small front wheels 10. The front wheels 10, which are of a diameter considerably less than the traction wheels, have flat peripheries and are provided at the centers thereof with annular flanges 11, adapted to embed themselves in the ground to enable the front wheels to obtain the proper hold on the soil for guiding the traction engine.

The traction engine is guided by steering mechanism comprising in its construction a pair of longitudinal guide chains 12, connected at their front ends with the front axle 4 at opposite sides of the bolster 3, and extending through a depending guiding hanger 13 and connected at their rear ends to a winding drum 14. The front ends of the chains are linked into eyes 15 of collars or bands 16, which are secured to the front axle 4, and the guiding hanger 13 consists of a horizontal bottom portion and inclined sides, which are bolted or otherwise secured at their upper terminals 17 to spaced portions of the frame 1, preferably at opposite sides of the reduced front portion 7 thereof. The guide chains 12 converge rearwardly from the front axle to the guiding hanger 13, and extend rearwardly from the latter in parallelism to the winding drum 14 and are wound around the same in opposite directions, whereby when the winding drum is rotated one of the guide chains will be wound thereon and the other unwound therefrom. The winding shaft, which is journaled in suitable bearings 18 of the frame 1, is equipped at one end with a worm wheel 19, which meshes with a worm 20 of an inclined steering shaft 21. The steering shaft extends upwardly and rearwardly at one side of the rear portion of the traction engine, and is mounted in upper and lower bearings 22 and 23, and is equipped at its upper rear end with a hand wheel 24, located adjacent to a motor 25. The motor 25, which preferably consists of a four cylinder gasolene engine, may be of any other preferred type, and it is mounted in a superimposed position with relation to the main frame upon suitable front and rear supports or sub-frames 26, located at the front and rear ends of the engine and extending across the main frame and suitably secured to the same. The motor is elevated above the main frame to support it and its fly wheel or driving wheel 27 clear of the main axle and the main frame.

The driving wheel 27 of the engine is located at the front end of the driving shaft, which is provided at its rear end with a crank 28, located above a platform 29 and adapted to be turned for cranking the engine. The platform 29, for the accommodation of the operator, is supported by suitable brackets 30, having horizontal outwardly extending platform receiving portions and provided with depending vertical portions, which are secured at their upper terminals 31 to the main frame 1 of the traction engine. The platform preferably consists of spaced slats or bars, secured to the horizontal portions of the brackets, and it is braced by inclined bars 32, having rear horizontal portions and inclined front portions, the rear horizontal portions being extended beneath and secured to the platform, and the inclined portions being extended upwardly and forwardly to the main frame and suitably secured to the same. The platform may be braced in any other desired manner, and is equipped with a central longitudinal draw bar 33.

The fly wheel or driving wheel of the motor is arranged in a transverse plane and is equipped with a friction rim 34 of fiber, paper or other suitable material, preferably in the form of a disk, or a ring, as illustrated in Fig. 3 of the drawings, and adapted to be engaged by either of the spaced metallic friction disks 35, fixed to a transmission shaft 36, journaled in suitable bearings of the main frame and extending across the same and shiftable longitudinally to carry either of its friction disks or elements into contact with the friction disk or element of the motor, whereby forward or backward rotary motion is transmitted to the shaft 36. The friction disks 35 are also adapted to be held out of engagement with the driving wheel for stopping the transmission shaft. The shifting of the shaft is effected by a longitudinal lever 37, located at one side of the rear portion of the frame of the machine and fulcrumed near its front end to a bracket 38 by a suitable pivot 39, and equipped at its rear end with a spring actuated latch or detent 40, arranged to engage notches of a segment 41 and controlled by a latch lever 42. The latch lever 42 is mounted on the shifting lever 37 adjacent to the handle portion thereof, as clearly illustrated in Fig. 1 of the drawings. The front end 43 of the shifting lever is forked to straddle a sleeve 44, which is provided with an annular groove 45 to receive studs or projections 46 of the forked end of the shifting lever, but any other suitable means may be employed for connecting the shifting lever with the transmission shaft.

The transmission shaft is extended beyond one side of the main frame, and it carries a driving pulley 47, adapted to be connected by a belt with an agricultural or other machine for actuating the same, when the traction engine is arranged for use as a stationary engine, as hereinafter fully explained. The shiftable transmission shaft also carries a clutch, located between the spaced friction wheels 35 and composed of a loose section 48 and a slidable section 49, movable along the shaft into and out of engagement with the loose section and connected with the shaft by a key or feather 50. The clutch sections are conical, and the section 48 consists of a conical shell open at one side and forming a conical recess to receive the solid conical or tapered section 49. Any other suitable form of clutch, however, may be employed, and when the slidable clutch section is moved into engagement with the loose clutch section 48, the latter is connected with the shaft and rotary motion is transmitted from the shaft 36 by means of intermediate gearing consisting of a pinion 51 and a gear wheel 52 to sections 53 and 54 of a transverse shaft, arranged in parallelism with the transmission shaft and mounted in suitable bearings of the main frame 1. The pinion 51 is rigid with the loose section 48, being preferably formed integral with the same, and the gear wheel 52, which meshes with the pinion, is connected by differential gearing with the sections 53 and 54. Motion is communicated from the sections 53 and 54 to the traction wheels by side sprocket gearing consisting of sprocket chains 55, arranged on front sprocket pinions 56 of the sections 53 and 54 and on rear sprocket wheels 57, which are connected with the traction wheels. The differential gearing, which connects the spur gear wheel 52 to the sections 53 and 54, performs its accustomed function of equalizing the power transmitted to the traction wheels.

The slidable section of the clutch is provided with an extended hub portion 58, having an annular groove 59, which is engaged by a forked portion 60 of an upright shifting lever 61, pivoted to a bracket 62, as clearly illustrated in Fig. 3 of the drawings. The bracket 62, which is mounted on the main frame at one side of the center, is provided at the top with a transversely arranged toothed segment 63, which is engaged by a dog or detent 64 of the upright shifting lever 61. The lever 61 is adapted to maintain the clutch sections in and out of engagement for transmitting motion to the driving mechanism of the traction engine, and also for disconnecting the driving mechanism from the transmission shaft to permit the traction engine to be operated as a stationary engine. The slidable clutch section is moved a sufficient distance beyond the loose section by the shifting lever 61, so that there is no liability of the shifting of the transmission shaft through the longitudinal shifting lever 37 carrying the loose section of the clutch into engagement with the slidable section thereof. When the clutch sections are in engagement, motion is transmitted to the driving gearing, and the traction engine may be driven either forwardly or backwardly by shifting the transmission shaft and engaging either of the friction wheels 35 with the friction disk or element of the driving shaft of the motor, and the traction engine may be stopped by adjusting the transmission shaft so that neither of the friction wheels thereof is in engagement with the friction element of the driving shaft.

Having thus fully described my invention, what I claim as new and desire to secure by Letters Patent, is:—

1. In a traction engine, the combination with driving or traction wheels, of a motor actuated gear element, a transmission shaft having spaced gears and mounted so as to be shiftable longitudinally, means connected with the transmission shaft for shifting the same to engage either of the gears thereof with the said gear element, a clutch mounted on the transmission shaft, gearing for transmitting motion from the clutch to the traction wheels, and a driving pulley mounted on the transmission shaft.

2. In a traction engine, the combination with driving or traction wheels, of a transversely disposed motor actuated gear element, a transversely disposed transmission shaft having spaced gears and mounted so as to be shiftable longitudinally, a lever connected with the transmission shaft for shifting the same to engage either of the gears thereof with the said gear element, a clutch mounted on the transmission shaft between the gears thereof, gearing connected with the clutch for transmitting motion to the driving or traction wheels, and a driving pulley mounted on the transmission shaft.

3. In a traction engine, the combination with driving or traction wheels, of a motor actuated gear element, a transversely disposed transmission shaft having spaced gears and mounted so as to be shiftable longitudinally, means connected with the transmission shaft to shift the same to carry either of its gears into mesh with the said gear element, a clutch mounted on the transmission shaft, a transverse shaft, side gearing located at opposite sides of the traction engine for connecting the latter shaft with the driving or traction wheels, and intermediate gearing connecting the transverse shaft with the clutch of the transmission shaft.

4. In a traction engine, the combination with driving or traction wheels, of a motor actuated gear element, a transmission shaft having spaced gears and mounted so as to be shifted longitudinally, a lever connected with the transmission shaft for shifting the same to move either of the gears thereof into engagement with the motor actuated gear element, a clutch mounted on the transmission shaft between the gears thereof, a sectional shaft, sprocket gearing connecting the sections thereof with the driving or traction wheels, and intermediate gearing connecting the sections of the shaft with the clutch.

5. A traction engine including a frame, a rear axle secured to the frame, traction or driving wheels mounted on the rear axle, an engine, a transverse gear element mounted on its shaft, a transmission shaft extending across the frame and having spaced gears mounted so as to be shiftable longitudinally, a shifting lever connected with the transmission shaft for shifting the same to engage either of the gears thereof with the gear element of the engine, a transverse shaft mounted on the frame in advance of the transmission shaft, side gearing connecting the transverse shaft with the driving or traction wheels, intermediate gearing including a clutch for connecting the transverse and transmission shafts, and a shifting lever connected with the clutch for operating the same.

In testimony, that I claim the foregoing as my own, I have hereto affixed my signature in the presence of two witnesses.

HENRY J. HEIDER.

Witnesses:
GRACE P. KALLENBERG,
MARY E. HEIDER.

Copies of this patent may be obtained for five cents each, by addressing the "Commissioner of Patents, Washington, D. C."